US008823927B2

(12) United States Patent
Chan et al.

(10) Patent No.: US 8,823,927 B2
(45) Date of Patent: Sep. 2, 2014

(54) SYSTEM AND METHOD FOR NONDESTRUCTIVE MEASURING REFRACTIVE INDEX AND THICKNESS OF LENS

(75) Inventors: Chia-Yen Chan, Hsinchu (TW);
Shenq-Tsong Chang, Hsinchu (TW);
Ting-Ming Huang, Hsinchu (TW);
Po-Han Huang, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 119 days.

(21) Appl. No.: 13/468,129

(22) Filed: May 10, 2012

(65) Prior Publication Data

US 2013/0301038 A1 Nov. 14, 2013

(51) Int. Cl.
*G02B 13/00* (2006.01)
*G01B 1/00* (2006.01)

(52) U.S. Cl.
USPC ........................................................ 356/128

(58) Field of Classification Search
CPC ............. G02B 13/00; G01B 1/00; G01B 9/00
USPC .................................................. 356/125, 128
See application file for complete search history.

(56) References Cited

U.S. PATENT DOCUMENTS

| | | | | |
|---|---|---|---|---|
| 5,408,311 A | * | 4/1995 | Suzuki et al. | 356/124 |
| 5,432,596 A | * | 7/1995 | Hayashi | 356/124 |
| 5,742,381 A | * | 4/1998 | Ueno | 356/124 |
| 7,286,211 B2 | * | 10/2007 | Suzuki | 356/124 |

* cited by examiner

*Primary Examiner* — Roy M Punnoose
(74) *Attorney, Agent, or Firm* — Bacon & Thomas, PLLC (57) ABSTRACT

The present invention discloses a system and method for nondestructively measuring the refractive index and the central thickness of a lens. The system comprises a radius measurement module arranged for measuring the curvature radius of the first surface of the lens; a focus measurement module arranged for measuring the best focus distance of the first surface of the lens; and a calculation module arranged for performing the first or the second calculation process according to the lensmaker's formula. Wherein, when the central thickness is given, the calculation module performs the first calculation process according to the curvature radius, the best focus distance and the central thickness to calculate the refractive index. On the contrary, when the refractive index is given, the calculation module performs the second calculation process according to the curvature radius, the best focus distance and the refractive index to calculate the central thickness.

16 Claims, 6 Drawing Sheets

FIG. 1 (Piror art)

FIG. 2 (Piror art)

SYSTEM AND METHOD FOR NONDESTRUCTIVE MEASURING REFRACTIVE INDEX AND THICKNESS OF LENS

BACKGROUND OF THE INVENTION

1. Field of the Invention

The present invention generally relates to a system and method for measuring the refractive index and the thickness of a lens, in particular to a system and method for nondestructively measuring the refractive index and the thickness of a lens.

2. Description of the Related Art

Nowadays, the rapid development in science and technology in the world has lead to the high demand of the optical products. The related commercial optical products or consumer electronics include digital cameras, cell-phone cameras, solid immersion lens, telescopes, microscopes and the like. On the contrary, technology development relies on fast and accurate measurement and manufacture of optical components. Therefore, the size of the electro-optic system could be reduced and the quality of the captured image thereof could be raised. The most important properties of the optical components are their refractive indices and thickness. Conventionally, the thickness of the transparent lens can be measured by the mechanical caliper. On the other hand, in order to measure the refractive index of the transparent lens, the lens sample must be cut to a square, plate or prism in shape at first and then the refractive index of the cut lens sample can be measured by a v-block refractometer, spectral goniometer, spectroimeter and the like.

Figure 1:
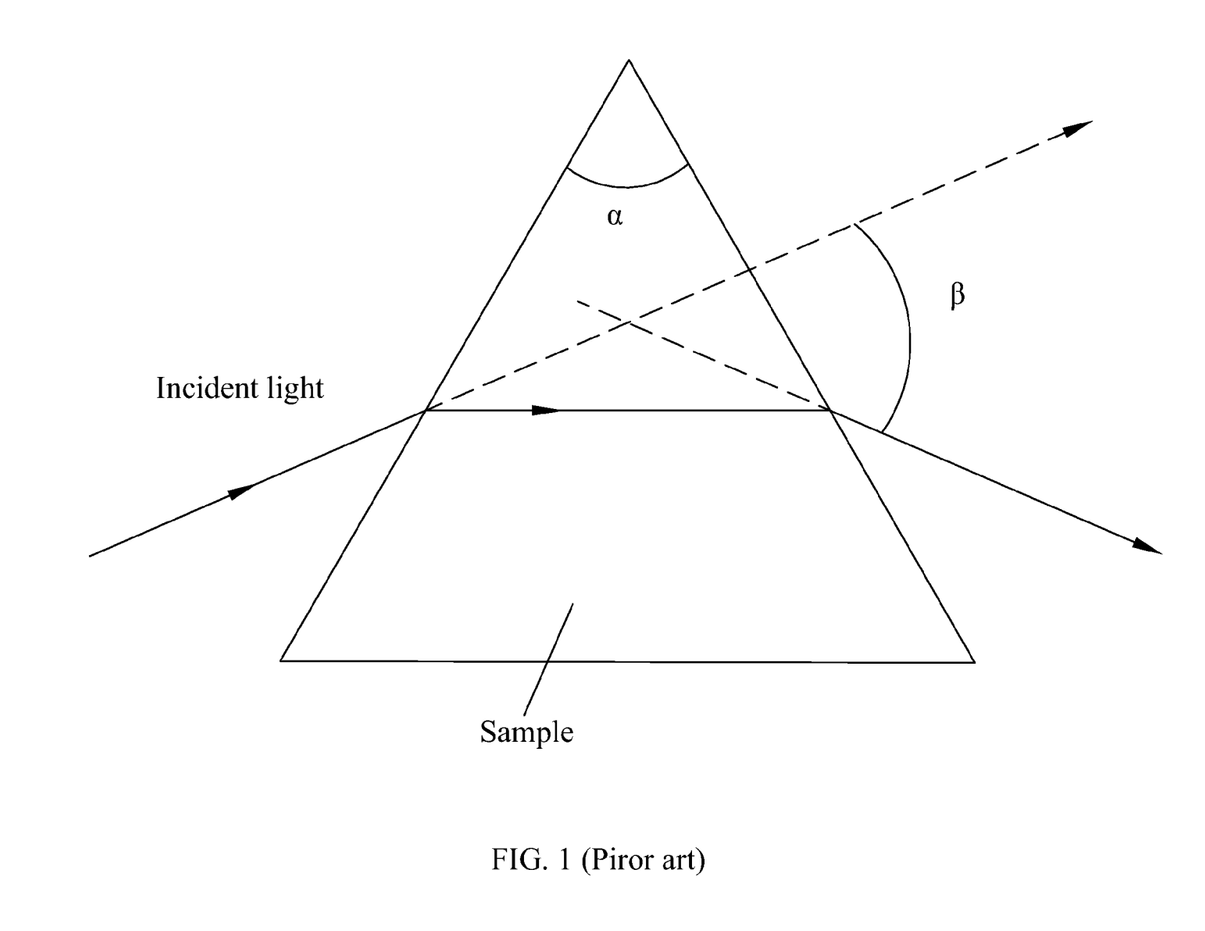
FIG. 1 and FIG. 2 are the schematic view of the conventional measurement method.

With reference to FIG. 1 for the schematic view of the conventional measurement method. As shown in FIG. 1, the lens sample is cut to a prism and then the refractive index thereof can be obtained according to the following formula:

$$n = \frac{\sin\frac{\alpha+\beta}{2}}{\sin\frac{\alpha}{2}};$$

wherein the minimum deviation angle of the prism is designated by $\beta$.

Figure 2:
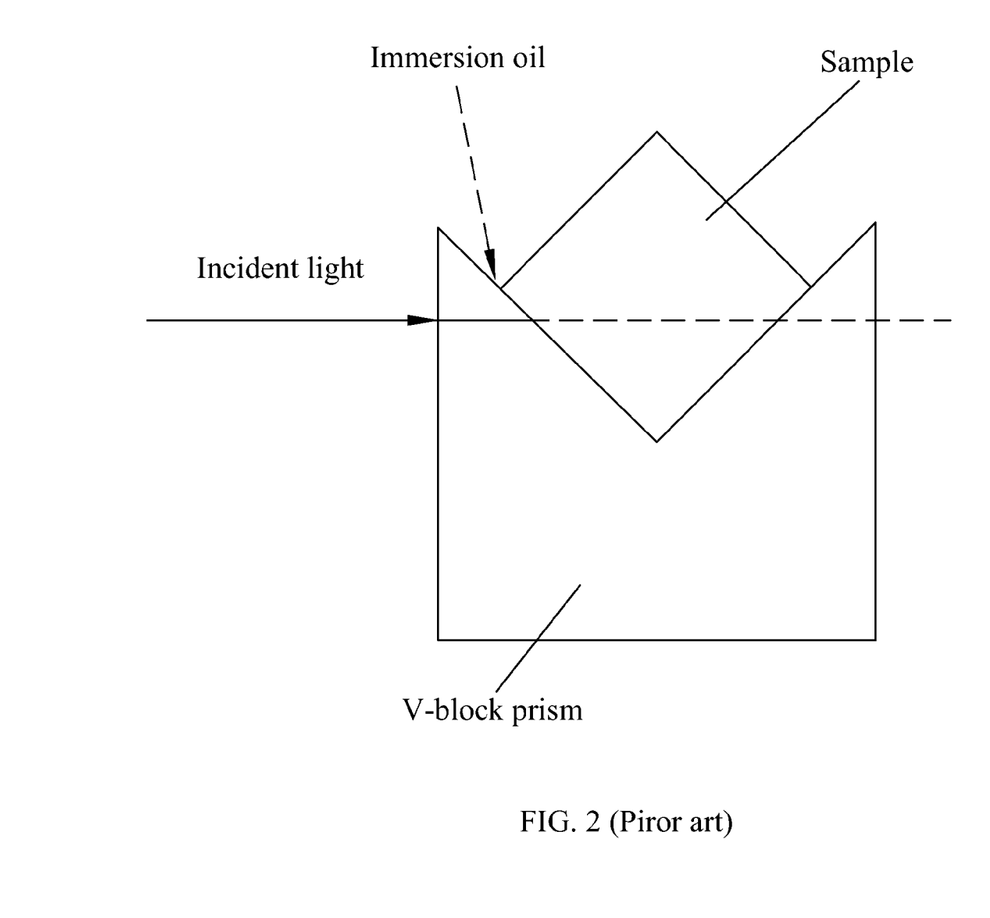

With reference to FIG. 2 for the schematic view of the conventional measurement method. As shown in FIG. 2, the lens sample is cut to a 20×20×5 mm³ prism and then the refractive index thereof can be determined by the v-block refractometer. Accordingly, the conventional measurement methods are considered to be destructive methods, which are not efficient and high-cost. Moreover, the aforementioned method is conducted to a limited lens sample size of about 20×20×5 mm³, which cannot be applied to the micro-lens.

SUMMARY OF THE INVENTION

Thus, it is the primary object of the present invention to provide a measurement system and method capable of nondestructively measuring the refractive index and the thickness of a lens to raise the efficiency thereof and reduce the cost for the measurement, and is applicable to the lenses of any sizes.

To achieve the foregoing objective, the present invention provides a measurement system for nondestructively measuring the refractive index or the central thickness of a lens. The system may comprise a radius measurement module, a focus measurement module and a calculation module. The radius measurement module may measure the curvature radius of the first surface of the lens. The focus measurement module may measure the best focus distance of the first surface of the lens. The calculation module may perform a first calculation process or a second calculation process according to the lensmaker's formula. Wherein, when the central thickness is given, the calculation module may perform the first calculation process according to the curvature radius, the best focus distance and the central thickness in order to calculate the refractive index; when the refractive index is given, the calculation module may perform the second calculation process according to the curvature radius, the best focus distance and the refractive index in order to calculate the central thickness.

To achieve the foregoing objective, the present invention further provides a method for nondestructively measuring the refractive index or the central thickness of a lens. The method is applicable to a measurement system, and the measurement system may comprise a radius measurement module arranged for measuring the curvature radius of the first surface of the lens, a focus measurement module arranged for measuring the best focus distance of the first surface of the lens and a calculation module arranged for performing a first calculation process or a second calculation process according to the lensmaker's formula. The method may comprise the following step of: performing the first calculation process according to the curvature radius, the best focus distance and the central thickness by the calculation module in order to calculate the refractive index when the central thickness is given, or performing the second calculation process according to the curvature radius, the best focus distance and the refractive index in order to calculate the central thickness when the refractive index is given.

To achieve the foregoing objective, the present invention still further provides a measurement system for nondestructively measuring the refractive index or the central thickness of a lens. The system may comprise a radius measurement module, a focus measurement module and a calculation module. The radius measurement module may measure the first curvature radius of the first surface of the lens and the second curvature radius of the second surface of the lens. The focus measurement module may measure the first best focus distance of the first surface of the lens and the second best focus distance of the second surface of the lens. The calculation module may perform the calculation process according to the lensmaker's formula. Wherein, the calculation module may performs the calculation process according to the first curvature radius, the second curvature radius, the first best focus distance and the second best focus distance in order to calculate the refractive index and the central thickness.

To achieve the foregoing objective, the present invention still further provides a method for nondestructively measuring the refractive index and the central thickness of a lens. The method is applicable to a measurement system, and the measurement system may comprise a radius measurement module arranged for measuring the first curvature radius of the first surface of the lens and the second curvature radius of the second surface of the lens, a focus measurement module arranged for measuring the first best focus distance of the first surface of the lens and the second best focus distance of the second surface of the lens and a calculation module arranged for performing the calculation process according to the lensmaker's formula. The method may comprise the following step of: performing the calculation process according to the first curvature radius, the first curvature radius, the second curvature radius, the first best focus distance and the second best focus distance by the calculation module in order to calculate the refractive index and the central thickness.

The system and method for nondestructively measuring the refractive index and the thickness of a lens according to the present invention may have the following advantages:

(1) The measurement system according to the present invention can measure the central thickness and the refractive index of the lens without cutting the lens, which significantly increases the efficiency of the measurement system and reduces the cost for measurement.

(2) The measurement system according to the present invention can be applicable to lenses of any sizes, hence the system of the present invention has a broader purpose than the conventional measurement system.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become clear by the detailed description of the following embodiments and the illustration of related drawings as follows.

Figure 3:
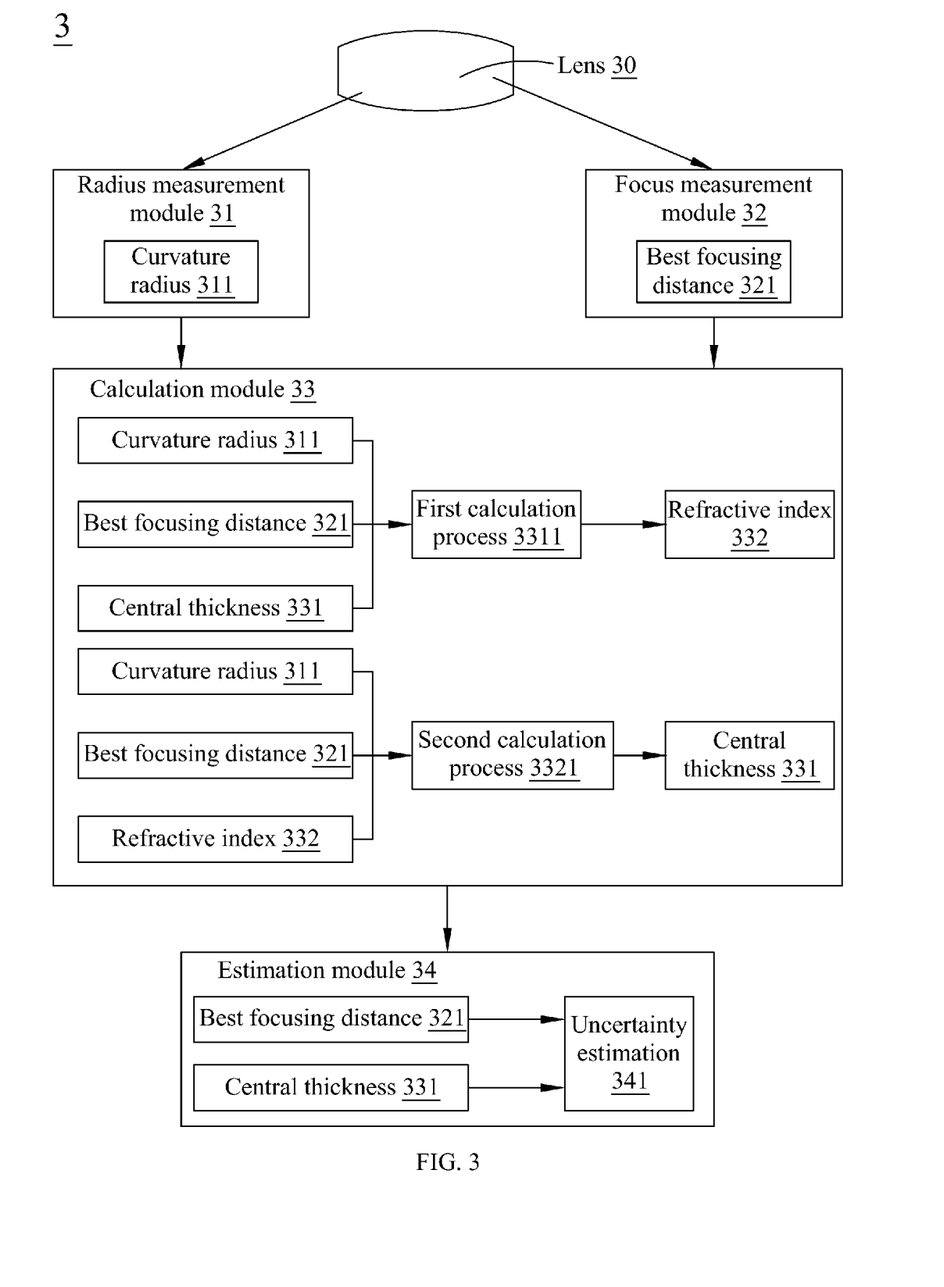
FIG. 3 is the block diagram of the first preferred embodiment of the measurement system according to the present invention.

With reference to FIG. 3 for the block diagram of the first preferred embodiment of the measurement system according to the present invention. As shown in FIG. 3, the measurement system 3 comprises the radius measurement module 31, the focus measurement module 32, the calculation module 33 and the estimation module 34. The user can use the radius measurement module 31 to measure the curvature radius 311 of the first surface of the lens 30. Similarly, the user can use the focus measurement module 32 to measure the best focus distance 321 of the first surface of the lens 30. The calculation module 34 can perform the first calculation process 3311 or the second calculation process 3321 according to the lensmaker's formula. If the refractive index 332 is given and the central thickness 331 remains unknown, the user can use the calculation module 33 to perform the second calculation process 3321 according to the curvature radius 311, the best focus distance 321 and the given refractive index 332 in order to calculate the central thickness 331. According to the lensmaker's formula, the curvature of the first surface of the lens 30 can be expressed as:

$$c_1 = 1/r \quad (1),$$

wherein the curvature of the first surface of the lens is designated by $c_1$, and the curvature radius 311 of the first surface of the lens is designated by $r_1$. Moreover, According to the lensmaker's formula, the relation between the best focus distance 321 the refractive index 332 and the central thickness 331 can also be expressed as:

$$\frac{1}{s_1} = \frac{n}{t} - c_1(n-1), \quad (2)$$

wherein the best focus distance 321 is designated by $s_1$, the central thickness 331 is designated by t, and the refractive index 332 is designated by n. Accordingly, t (central thickness 331) can be expressed as:

$$t = \frac{ns_1}{s_1 c_1 (n-1) + 1} \quad (3)$$

The second calculation process 3321 may comprise the formula (3). Thus, if the central thickness 331 remains unknown, the user can use the calculation module 33 to perform the second calculation process 3321 according to the curvature radius 311, the best focus distance 321 and the given refractive index 332 to obtain the central thickness 331. The radius measurement module may be a spherometer and the focus measurement module may be a centering device.

According to the formula (3), n (refractive index 332) can be further expressed as:

$$n = \frac{t(1 - s_1 c_1)}{s_1(1 - tc_1)} \quad (4)$$

The first calculation process 3311 may comprise the formula (4). Therefore, if the central thickness 331 is given and the refractive index 332 remains unknown, the user can use the calculation module 33 to perform the first calculation process 3311 according to the curvature radius 311, the best focus distance 321 and the central thickness 331 in order to calculate the refractive index 332.

Furthermore, the user can use the estimation module 34 to perform the uncertainty estimation 341 for the calculated central thickness 331 or refractive index 332 to estimate the uncertainty thereof, which can perfect the first calculation process 3311 and the second calculation process 3321.

According to the above description, the user can use the measurement system 3 to determine the unknown central thickness 331 or refractive index 332 without cutting the lens 30. Thus, the present invention can achieve nondestructive measurement and can be applied to the lens of any sizes.

Figure 4:
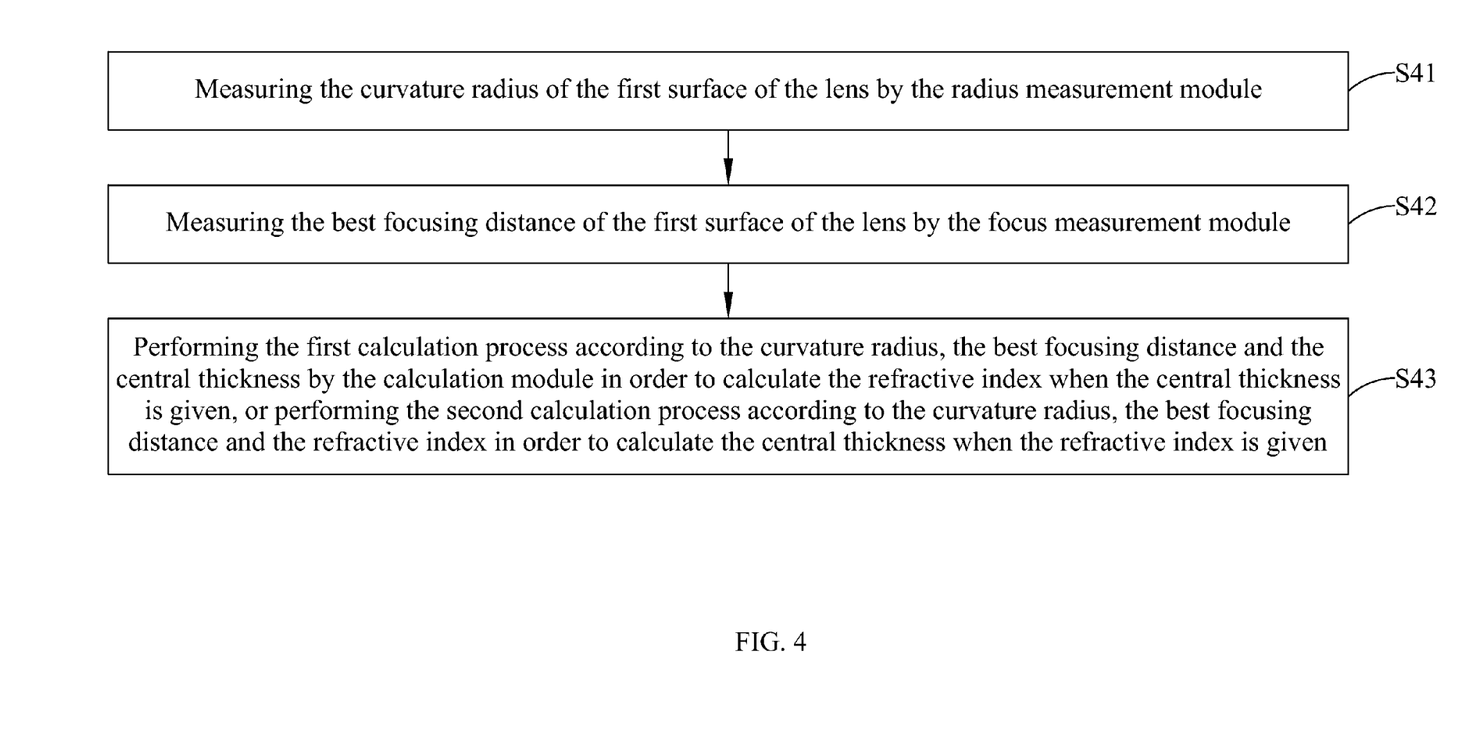
FIG. 4 is the flow chart of the first preferred embodiment of the measurement system according to the present invention.

With reference to FIG. 4 for the flow chart of the first preferred embodiment of the measurement system according to the present invention. The embodiment comprises the following steps of:

S41: measuring the curvature radius of the first surface of the lens by the radius measurement module.

S42: measuring the best focus distance of the first surface of the lens by the focus measurement module.

S43: performing the first calculation process according to the curvature radius, the best focus distance and the central thickness by the calculation module in order to calculate the refractive index when the central thickness is given, or performing the second calculation process according to the curvature radius, the best focus distance and the refractive index in order to calculate the central thickness when the refractive index is given.

Figure 5:
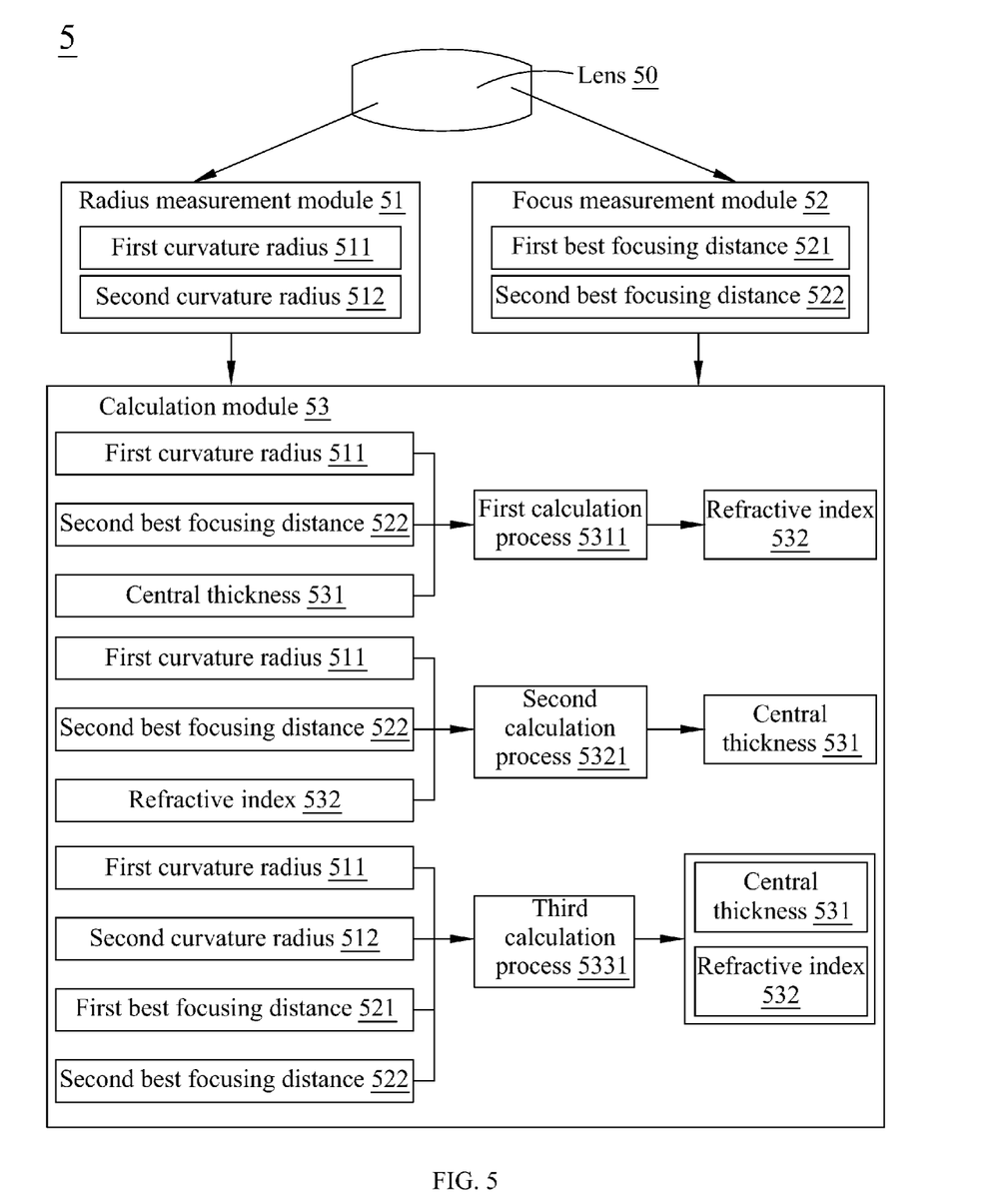
FIG. 5 is the block diagram of the second preferred embodiment of the measurement system according to the present invention.

With reference to FIG. 5 for the block diagram of the second preferred embodiment of the measurement system according to the present invention. As shown in FIG. 5, the measurement system 5 comprises the radius measurement module 51, the focus measurement module 52, the calculation module 53 and the estimation module 54. The user can use the radius measurement module 51 to measure the first curvature radius 511 of the first surface of the lens 50. Similarly, the user can use the focus measurement module 52 to measure the first best focus distance 521 of the first surface of the lens 50. The calculation module 54 can perform the first calculation process 5311 or the second calculation process 5321 according to the lensmaker's formula. If the refractive index 532 is given, the user can use the calculation module 53 to perform the second calculation process 5321 according to the first curvature radius 511, the first best focus distance 521 and the given refractive index 532 in order to calculate the central thickness 531. On the contrary, if the central thickness 531 is given, the calculation module 53 can perform the first calculation process 5311 according to the first curvature radius 511, the first best focus distance 521 and the central thickness 531 in order to calculate the refractive index 532. The first calculation process 5311 or the second calculation process 5321 are similar to the first embodiment, hence they will not be repeated again herein.

Furthermore, the user can use the focus measurement module 52 to further measure the second best focus distance 522 of the second surface of the lens 50 in addition to the first best focus distance 521. Similarly, the user can use the radius measurement module 51 to measure the second curvature radius 512 of the second surface of the lens 50 in addition to the first curvature radius 511. If both of the central thickness 531 and the refractive index 532 remain unknown, the user can use the calculation module 53 to perform the third calculation process 5331 according to the first curvature radius 511, the second curvature radius 512, the first best focus distance 521 and the second best focus distance 522 to calculate the central thickness 531 and the refractive index 532. The third calculation process 5331 is also based on the lensmaker's formula.

According to the formula (3), the t (central thickness 531) can be expressed as:

$$t = \frac{ns_1}{s_1 c_1 (n-1) + 1} = \frac{ns_2}{s_2 c_2 (n-1) + 1};$$

thus, n (refractive index 532) can be expressed as:

$$n = \frac{s_1 - s_2}{s_1 s_2 (c_1 - c_2)} + 1 \quad (5)$$

Also, according to the formula (4), n (refractive index 532) can be expressed as:

$$n = \frac{t(1 - s_1 c_1)}{s_1 (1 - t c_1)} = \frac{t(1 - s_2 c_2)}{s_2 (1 - t c_2)};$$

thus, t (central thickness 531) can be expressed as:

$$t = \frac{(s_1 - s_2) + s_1 s_2 (c_1 - c_2)}{s_1 c_1 - s_2 c_2} \quad (6)$$

The third calculation process 5331 may comprise the formulas (5) and (6). Therefore, if both of the central thickness 531 and the refractive index 532 remain unknown, the user can use the calculation module 53 to perform the third calculation process 5331 according to the first curvature radius 511, the second curvature radius 512, the first best focus distance 521 and the second best focus distance 522 to calculate the central thickness 531 and the refractive index 532.

Figure 6:
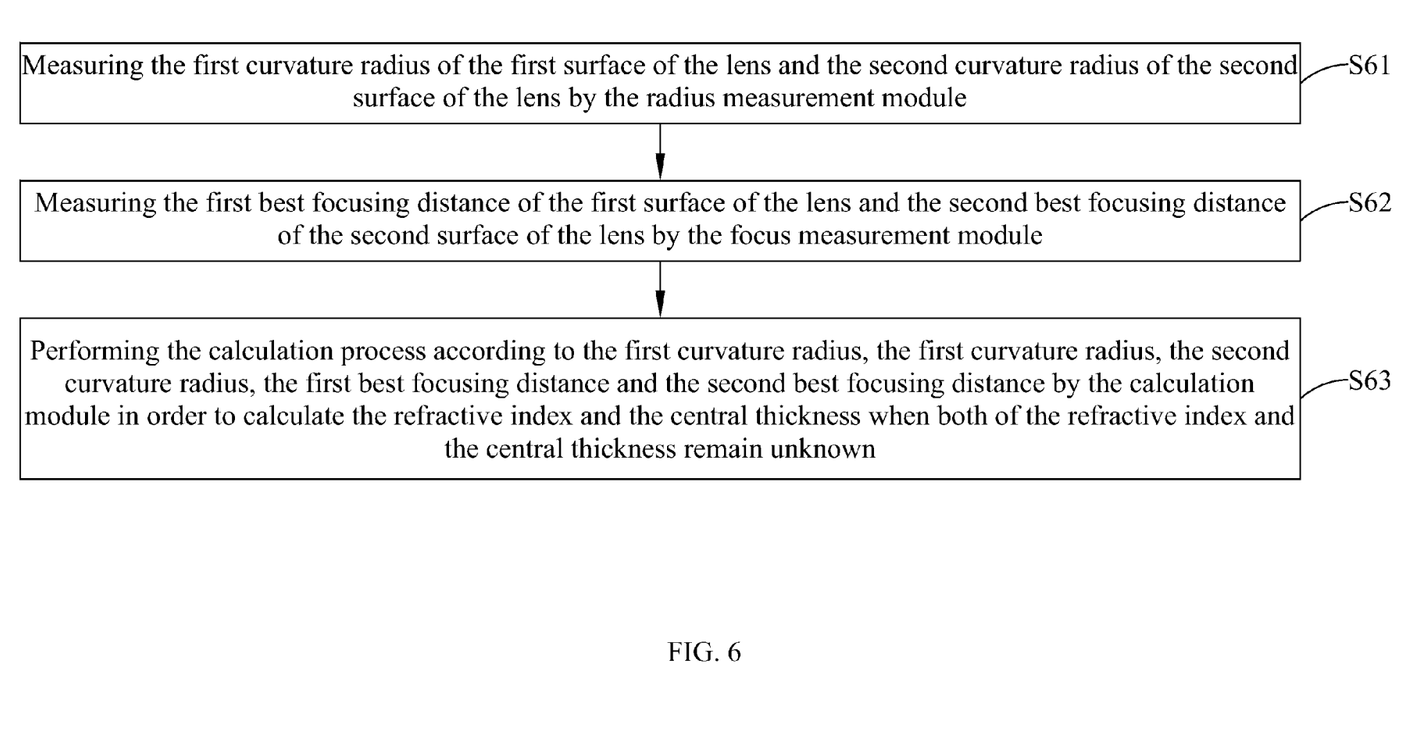
FIG. 6 is the flow chart of the second preferred embodiment of the measurement system according to the present invention.

With reference to FIG. 6 for the flow chart of the second preferred embodiment of the measurement system according to the present invention. The embodiment comprises the following steps of:

S61: measuring the first curvature radius of the first surface of the lens and the second curvature radius of the second surface of the lens by the radius measurement module.

S62: measuring the first best focus distance of the first surface of the lens and the second best focus distance of the second surface of the lens by the focus measurement module.

S63: performing the calculation process according to the first curvature radius, the first curvature radius, the second curvature radius, the first best focus distance and the second best focus distance by the calculation module in order to calculate the refractive index and the central thickness when both of the refractive index and the central thickness remain unknown.

Five glass lens samples whose nominal refractive indices, nominal central thicknesses measured by the mechanical caliper and nominal curvature radii measured by a spherometer (Trioptics Spherometers®) are listed in Table I for the following measurement of the refractive indices and thicknesses of the five transparent lenses. The shapes of the lens samples are plano-concave, plate, biconvex, convex-concave and plano-convex respectively. The measured best focus distances and the corresponding calculated central thicknesses and refractive indices on the first (upper) surface, second (lower) surface and both surfaces are shown in Tables II-IV separately. It is seen that the one-sided measurement results compared with the nominal values are more accurate than those of the two-sided measurement since the measurement uncertainty is accumulated in a two-sided measurement by the use of a centering device (Trioptics OptiCentric® MOT) in reflection mode. Therefore the aid of the mechanical caliper and Trioptics Spherometers® in advance will avoid a two-sided measurement and enhance the degree of accuracy.

TABLE I

Five Selected lens samples and their Nominal properties

| | Sample 1 | Sample 2 | Sample 3 | Sample 4 | Sample 5 |
|---|---|---|---|---|---|
| Material | Fused Silica | BK7 | PSK3 | PSK53A | SF11 |
| Shape | Plano-concave | Plate | Biconvex | Convex-concave | Plano-convex |
| Nominal t (mm) | 6.94 | 5.96 | 8.37 | 3.00 | 7.45 |
| Nominal n @ 546 nm | 1.45843 | 1.51670 | 1.55232 | 1.58900 | 1.80480 |
| Nominal $r_1$ (mm) | ∞ | ∞ | 200.13 | 57.99 | ∞ |
| Nominal $r_2$ (mm) | −77.64 | ∞ | 53.57 | −20.26 | 19.65 |

TABLE II

The best focus distances and calculated central thicknesses and refractive indices on the first surface.

|        | Sample 1 | Sample 2 | Sample 3 | Sample 4 | Sample 5 |
|--------|----------|----------|----------|----------|----------|
| $s_1$  | 4.754    | 3.933    | 5.410    | 1.919    | 4.125    |
| t (mm) | 6.933    | 5.965    | 8.372    | 2.991    | 7.444    |
| n      | 1.45984  | 1.51626  | 1.55193  | 1.59405  | 1.80627  |

TABLE III

The best focus distances and calculated central thicknesses and refractive indices on the second surface

|        | Sample 1 | Sample 2 | Sample 3 | Sample 4 | Sample 5 |
|--------|----------|----------|----------|----------|----------|
| $s_2$  | 4.625    | 3.933    | 5.413    | 1.781    | 4.966    |
| t (mm) | 6.935    | 5.965    | 8.375    | 2.985    | 7.448    |
| n      | 1.45937  | 1.51626  | 1.55123  | 1.59617  | 1.80544  |

TABLE IV

The best focus distances and calculated central thicknesses and refractive indices on the both surfaces

|        | Sample 1 | Sample 2 | Sample 3 | Sample 4 | Sample 5 |
|--------|----------|----------|----------|----------|----------|
| $s_1$  | 4.754    | 3.933    | 5.410    | 1.919    | 4.125    |
| $s_2$  | 4.625    | 3.933    | 5.413    | 1.781    | 4.966    |
| t (mm) | 6.91260  | —        | 8.39676  | 3.02178  | 7.45556  |
| n      | 1.45407  | —        | 1.55711  | 1.60626  | 1.80761  |

In summation of the description above, the measurement system according to the present invention can measure the central thickness and the refractive index of the lens without cutting the lens to specific shapes, which significantly increases the efficiency of the measurement system and reduces the cost for measurement. Besides, the measurement system according to the present invention can be applicable to lenses of any sizes, hence the system of the present invention has a broader purpose than the conventional measurement system. Accordingly, the present invention can effectively resolve the problems of the conventional measurement system.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A measurement system for nondestructively measuring a refractive index or a central thickness of a lens, comprising:
   a radius measurement module, arranged for measuring a curvature radius of a first surface of the lens;
   a focus measurement module, arranged for measuring a best focus distance of a first surface of the lens; and
   a calculation module, arranged for performing a first calculation process or a second calculation process according to a lensmaker's formula;
   wherein, when the central thickness is given, the calculation module performs the first calculation process according to the curvature radius, the best focus distance and the central thickness in order to calculate the refractive index; when the refractive index is given, the calculation module performs the second calculation process according to the curvature radius, the best focus distance and the refractive index in order to calculate the central thickness.

2. The measurement system of claim 1, wherein the first calculation process comprises the following formula:

$$n = \frac{t(1 - s_1 c_1)}{s_1(1 - t c_1)};$$

wherein, the refractive index is designated by n, the central thickness is designated by t, the best focus distance is designated by $s_1$, a curvature of the lens is designated by $c_1$ and the curvature is a reciprocal of the curvature radius.

3. The measurement system of claim 2, wherein the second calculation process comprises the following formula:

$$t = \frac{n s_1}{s_1 c_1 (n - 1) + 1};$$

wherein the central thickness of the lens is designated by t.

4. The measurement system of claim 1, wherein the radius measurement module is a spherometer.

5. The measurement system of claim 1, wherein the focus measurement module is a centering device.

6. The measurement system of claim 1, further comprising an estimation module, arranged for performing an uncertainty estimation to estimate an uncertainty of the first calculation process or the second calculation process.

7. A measurement system for nondestructively measuring a refractive index and a central thickness of a lens, comprising:
   a radius measurement module, arranged for measuring a first curvature radius of a first surface of the lens and a second curvature radius of a second surface of the lens;
   a centering device, arranged for measuring a first best focus distance of the first surface of the lens and a second best focus distance of the second surface of the lens; and
   a calculation module, arranged for performing a calculation process according to a lensmaker's formula;
   wherein, the calculation module performs the calculation process according to the first curvature radius, the second curvature radius, the first best focus distance and the second best focus distance in order to calculate the refractive index and the central thickness.

8. The measurement system of claim 7, wherein the calculation process comprises the following formulas:

$$n = \frac{s_1 - s_2}{s_1 s_2 (c_1 - c_2)} + 1 \text{ and } t = \frac{(s_1 - s_2) + s_1 s_2 (c_1 - c_2)}{s_1 c_1 - s_2 c_2};$$

wherein, the first best focus distance is designated by $s_1$, the second best focus distance is designated by $s_2$, a first curvature of the lens is designated by $c_1$ and is a reciprocal of the first curvature radius, a second curvature of the lens is designated by $c_2$ and is a reciprocal of the second curvature radius.

9. The measurement system of claim 7, further comprising an estimation module, arranged for performing an uncertainty estimation to estimate an uncertainty of the calculation process.

10. A method for nondestructively measuring a refractive index or a central thickness of a lens, being applicable to a measurement system, the measurement system comprising a radius measurement module arranged for measuring a curvature radius of a first surface of the lens; a focus measurement module arranged for measuring a best focus distance of the first surface of the lens; and a calculation module arranged for performing a first calculation process or a second calculation process according to a lensmaker's formula, the method comprising the following step of:

performing the first calculation process using the curvature radius measured by said radius measurement module, the best focus distance measured by said focus measurement module and the central thickness, said calculation process made by the calculation module in order to calculate the refractive index when said central thickness is given, or performing the second calculation process using the curvature radius measured by said radius measurement module, the best focus distance measured by said focus measurement module and the given refractive index, said calculation process made by the calculation module in order to calculate the central thickness when said refractive index is given.

11. The method of claim 10, wherein the first calculation process comprises the following formula:

$$n = \frac{t(1 - s_1 c_1)}{s_1(1 - tc_1)};$$

wherein, the refractive index is designated by n, the central thickness is designated by t, the best focus distance is designated by $s_1$, a curvature of the lens is designated by $c_1$ and the curvature is a reciprocal of the curvature radius.

12. The method of claim 11, wherein the second calculation process comprises the following formula:

$$t = \frac{ns_1}{s_1 c_1(n - 1) + 1};$$

wherein the central thickness of the lens is designated by t.

13. The method of claim 10, further comprising the following step of:
performing an uncertainty estimation to estimate an uncertainty of the first calculation process or the second calculation process.

14. A method for nondestructively measuring a refractive index and a central thickness of a lens, being applicable to a measurement system, the measurement system comprising a radius measurement module, arranged for measuring a first curvature radius of a first surface of the lens and a second curvature radius of a second surface of the lens; a focus measurement module, arranged for measuring a first best focus distance of the first surface of the lens and a second best focus distance of the second surface of the lens; and a calculation module, arranged for performing a calculation process according to a lensmaker's formula, the method comprising the following step of:

performing the calculation process using the first curvature radius and the second curvature radius measured by said radius measurement module, and using the first best focus distance and the second best focus distance measured by said focus measurement module, said calculation process made by the calculation module in order to calculate the refractive index and the central thickness.

15. The method of claim 14, wherein the calculation process comprises the following formulas:

$$n = \frac{s_1 - s_2}{s_1 s_2(c_1 - c_2)} + 1 \text{ and } t = \frac{(s_1 - s_2) + s_1 s_2(c_1 - c_2)}{s_1 c_1 - s_2 c_2};$$

wherein, the first best focus distance is designated by $s_1$, the second best focus distance is designated by $s_2$, a first curvature of the lens is designated by $c_1$ and is a reciprocal of the first curvature radius, a second curvature of the lens is designated by $c_2$ and is a reciprocal of the second curvature radius.

16. The method of claim 14, further comprising the following step of:
performing an uncertainty estimation to estimate an uncertainty of the calculation process.

* * * * *